UNITED STATES PATENT OFFICE.

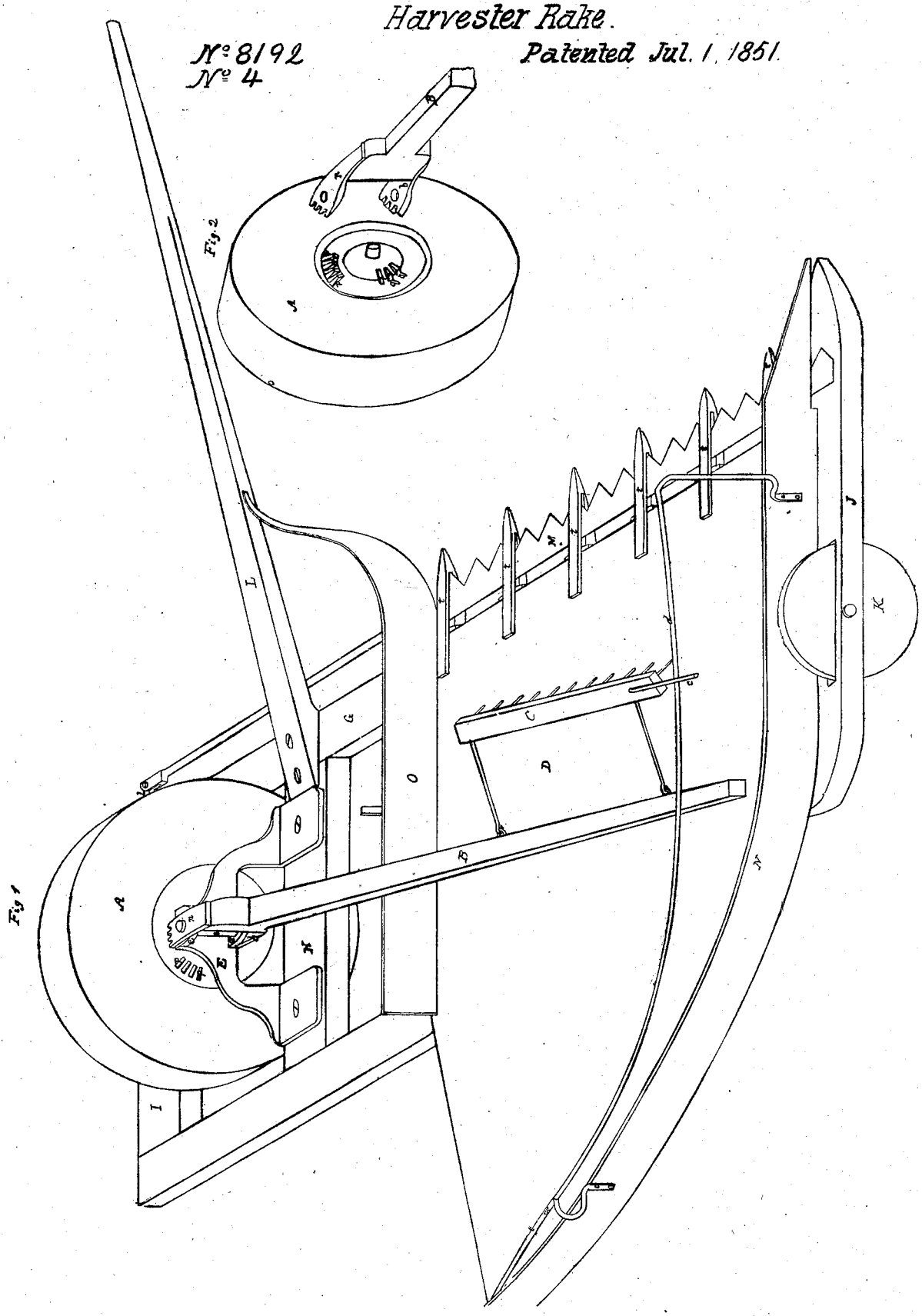
Palmer & Williams.
Harvester Rake.
Nº 8192
Nº 4
Patented Jul. 1, 1851.

A. PALMER AND S. G. WILLIAMS, OF BROCKPORT, NEW YORK.

IMPROVEMENT IN GRAIN-HARVESTERS.

Specification forming part of Letters Patent No. 8,192, dated July 1, 1851.

*To all whom it may concern:*

Be it known that we, AARON PALMER and S. G. WILLIAMS, of Brockport, in the county of Monroe and State of New York, have invented a new and Improved Harvesting-Machine; and we do hereby declare that the following is a full and exact description thereof, reference being had to the accompanying drawings, making a part of this specification—

Figure 1 being a perspective view of the entire machine, and Fig. 2 a perspective view of a portion thereof detached.

Similar letters indicate like parts in both the figures.

The frame of our harvesting-machine is composed of the side pieces, F G, the end pieces, I J, and the transverse piece H. The main wheel A of the machine is placed between the end I and the transverse piece H of the frame, and has its bearings in the arch-support E, rising from the transverse piece H, and in a corresponding support rising from the end I of the machine.

D is the platform for the reception of the heads and upper portions of the stalks of the grain as they are severed by the cutting apparatus M, which is located at the front edge of the said platform. A straight fence or guard, O, rises from the inner edge of the platform D, and a curved guard, N, rises from the outer edge of the same. An inclined rail, $d$, is supported above the guard N, as represented in Fig. 1. At the rear end of the rail $d$ a short rail or gate, $f$, is jointed thereto, the rear end of which rests upon the guard N, and beyond the extremity of the hinged rail $f$ a rail, $g$, surmounts the after edge of the guard N, which has an upward inclination. The rake C is connected to the operating-lever B by arms which are hinged to the said lever. The lever B has toothed legs $n$ $b$ projecting from its inner end, which embrace the ears $e$ $e$, that project outward from the wheel-bearing support E. A fulcrum-pin, $s$, passes down through the legs $n$ $b$ of the lever B and through the ears $e$ $e$, which supports the lever in a horizontal position, and on which it can turn freely.

Within a recess in the face of the wheel A the outer and inner series of teeth, $p$ and $q$, project, as shown in Fig. 2, which series of teeth respectively match into the teeth in the legs $n$ $b$ of the lever B when the wheel is rotated, and thereby cause the said lever to turn back and forth upon its axis. When the outer end of the lever B passes rearward the teeth of the rake C rest upon the platform D and carry the grain before it and discharge the same off the rear or inner edge of the platform in suitable quantities for binding. Just before the rake C reaches its extreme rearward position the pin $c$, which projects from its outer extremity, passes from beneath the hinged portion $f$ of the inclined rail $d$, and when the lever B is turned forward the rake C is elevated from the platform D as it is pushed forward by the action of the pin $c$ in passing up and bearing upon the inclined rail $d$. The lever B is turned rearward by the action of the series of teeth $p$ upon the teeth in the extremity of the lever's leg $n$, and it remains in its extreme rearward position during about two-thirds the revolution of the wheel, when the series of teeth $q$ strike into the teeth in the lever's leg $b$ and carry the lever forward so far that the pin $c$, projecting from the rake C, will pass over the angle of the rail $d$ and allow the said rake to fall upon the front edge of the platform D. The instant that the series of teeth $q$ cease their action upon the teeth of the lever's leg $b$ the series of teeth $p$ take into the teeth in the lever's leg $n$ and turn the lever and the rake rearward again.

It will be perceived that the grain is discharged in such a position as to be entirely out of the way of the horses which draw the machine during their succeeding tour around the field.

The arrangement of the operating-lever B is such as to enable the gearing which operates it to be located within a recess in the wheel A, and thereby prevents the access of dirt to it, which would interfere with its free action, and would cause the speedy destruction of the operating teeth. The series of teeth $p$ $q$ may be located within a recess in the wheel A; or a protecting rim or flange may surround them.

The apparatus M for cutting the grain may be constructed and operated in any well-known or usual manner.

What we claim as our invention, and desire to secure by Letters Patent, is—

The discharging the cut stalks and heads of grain from the platform D by means of the combination of the rake C with the lever B, and the co-operation therewith of the series of teeth *p q* on the face of the wheel A, and the inclined rail *d*, rising above the curved guard of the platform D, substantially in the manner herein set forth.

The above specification of our improved harvesting-machine signed and witnessed this 25th day of February, 1851.

AARON PALMER.
     S. G. WILLIAMS.

Witnesses:
 G. B. WHITESIDE,
 GEORGE W. SOLES.